(12) United States Patent
Stanley

(10) Patent No.: US 9,772,200 B2
(45) Date of Patent: Sep. 26, 2017

(54) POSITION MEASUREMENT USING ANGLED COLLECTORS

(71) Applicant: Bourns, Inc., Riverside, CA (US)

(72) Inventor: James Gregory Stanley, Novi, MI (US)

(73) Assignee: BOURNS, INC., Riverside, CA (US)

( * ) Notice: Subject to any disclaimer, the term of this patent is extended or adjusted under 35 U.S.C. 154(b) by 128 days.

(21) Appl. No.: 13/835,273

(22) Filed: Mar. 15, 2013

(65) Prior Publication Data
US 2014/0266157 A1   Sep. 18, 2014

(51) Int. Cl.
*G01B 7/14*   (2006.01)
*G01B 7/00*   (2006.01)
*G01D 5/14*   (2006.01)

(52) U.S. Cl.
CPC .................................. *G01D 5/145* (2013.01)

(58) Field of Classification Search
CPC ...... G01D 5/145; G01D 11/245; G01D 5/147; G01D 5/2216; G01D 5/142; G01D 5/14; G01D 5/16; G01D 5/20; G01D 5/2006; G01D 5/2013; G01D 5/202; G01D 5/2026; G01D 5/2033; G01D 5/204; G01D 5/2046;
(Continued)

(56) References Cited

U.S. PATENT DOCUMENTS 3,179,856 A    4/1965  Kuhrt et al.
4,791,365 A *  12/1988 Johannes et al. ........ 324/207.25
(Continued)

FOREIGN PATENT DOCUMENTS

CN   101147044 A   3/2008
CN   102203560 A   9/2011
(Continued)

OTHER PUBLICATIONS

International Search Report and Written Opinion of the International Searching Authority, received for International Patent Application No. PCT/US2014/022819, mailed Jul. 14, 2014 (11 pages).
(Continued)

*Primary Examiner* — Tung X Nguyen
*Assistant Examiner* — Lee Rodak
(74) *Attorney, Agent, or Firm* — Michael Best & Friedrich LLP

(57) ABSTRACT

A magnetically-based position sensor. The sensor includes a magnet, a first collector, a second collector, and a magnetic sensing element. The magnet has at least two poles, and moves along a path. The first collector has a first end and a second end and is configured to collect a magnetic flux. In addition, the first collector is positioned at an angle relative to an axis running parallel to the path and perpendicular to the magnet. The second collector is configured to collect a magnetic flux, and is positioned at an angle relative to the axis running parallel to the path and perpendicular to the magnet, and parallel to the first collector. The magnetic sensing element is coupled to the first and second collectors. A magnetic flux is collected by the first and second collectors, and varies as the magnet moves along the path such that the magnetic flux collected by the first and second collectors indicates a position of the magnet along the path.

25 Claims, 8 Drawing Sheets

(58) Field of Classification Search

CPC ........ G01D 5/2053; G01D 5/206; G01D 5/22;
G01D 5/2208; G01D 5/2225; G01D
5/2233; G01D 5/2241; G01D 5/225;
G01D 5/2258; G01D 5/2266; G01D
5/2275; G01D 5/2283; G01B 13/02;
G01B 7/003; G01B 7/30; G01B 7/14;
G01B 7/02; G01B 7/31; G01B 7/023;
G01B 7/04; G01B 7/046; G01B 7/305;
G01B 7/312; G01L 3/104; G01R 33/022;
G01R 33/07; G01R 33/077; G01R
33/095; G01R 33/0005; G01R 33/072;
G01R 15/207; G01R 33/00; G01R
33/0035; G01R 33/04; G01R 33/063;
G01R 33/075; G01R 15/20; G01R
15/202; G01R 15/205; G01R 33/0094;
G01V 3/08; F15B 15/2861; B60N
2002/0272; H01L 43/00; H01L 43/06;
H01L 43/08

USPC ........... 324/207.2, 207.11–207.26, 160–180;
702/145–148, 151

See application file for complete search history.

(56) References Cited

U.S. PATENT DOCUMENTS

| | | | | |
|---|---|---|---|---|
| 4,841,246 A | * | 6/1989 | Juds | G01D 5/145 324/207.11 |
| 5,359,288 A | * | 10/1994 | Riggs | G01B 7/02 188/284 |
| 5,570,015 A | * | 10/1996 | Takaishi et al. | 324/207.21 |
| 5,600,238 A | * | 2/1997 | Holloway | G01D 5/147 324/207.21 |
| 5,719,496 A | * | 2/1998 | Wolf | 324/165 |
| 5,781,005 A | * | 7/1998 | Vig et al. | 324/207.2 |
| 6,518,749 B1 | * | 2/2003 | Oudet | G01D 5/145 324/207.2 |
| 6,577,119 B1 | * | 6/2003 | Yaddehige | 324/207.2 |
| 6,867,583 B2 | | 3/2005 | Mizutani et al. | |
| 7,221,153 B2 | * | 5/2007 | Matsumoto et al. | 324/207.25 |
| 7,302,940 B2 | * | 12/2007 | Schneider | F02M 25/0756 123/568.21 |
| 7,843,190 B2 | | 11/2010 | Nishida et al. | |
| 2002/0153879 A1 | * | 10/2002 | Muraji et al. | 324/207.2 |
| 2003/0155909 A1 | * | 8/2003 | Steinruecken | G01D 5/147 324/207.2 |
| 2004/0217757 A1 | * | 11/2004 | Tromblee | G01D 5/145 324/207.2 |
| 2005/0012500 A1 | * | 1/2005 | Braun et al. | 324/207.24 |
| 2006/0192553 A1 | * | 8/2006 | Recio | G01D 5/145 324/207.24 |
| 2009/0045807 A1 | * | 2/2009 | Nishida et al. | 324/207.2 |
| 2010/0231204 A1 | * | 9/2010 | Tenbrink et al. | 324/207.13 |
| 2010/0289485 A1 | | 11/2010 | Eggimann | |

FOREIGN PATENT DOCUMENTS

| | | |
|---|---|---|
| JP | 6229708 | 8/1994 |
| WO | 0062031 | 10/2000 |
| WO | WO 2012003273 * | 1/2012 |

OTHER PUBLICATIONS

PCT Search Report and Written Opinion for Application No. PCT/US14/22819 dated Jul. 14, 2015 (15 pages).

Extended European Search Report from the European Patent Office for Application No. 14769448.3 dated Jan. 16, 2017 (8 pages).

First Office Action with English translation from the State Intellectual Property Office of the People's Republic of China for Application No. 201480016034.8 dated Mar. 1, 2017 (19 pages).

* cited by examiner

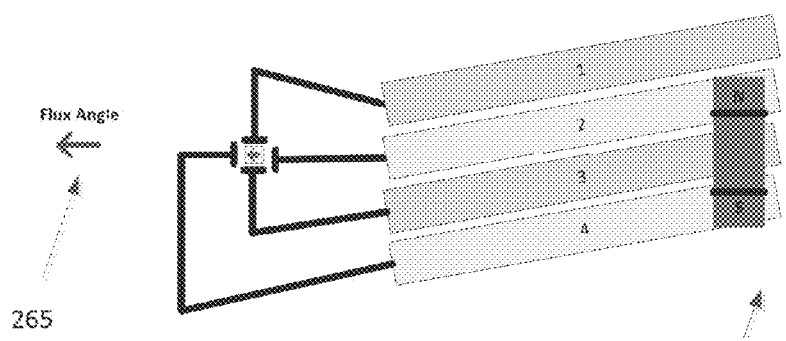
Fig. 7A  Fig. 7B
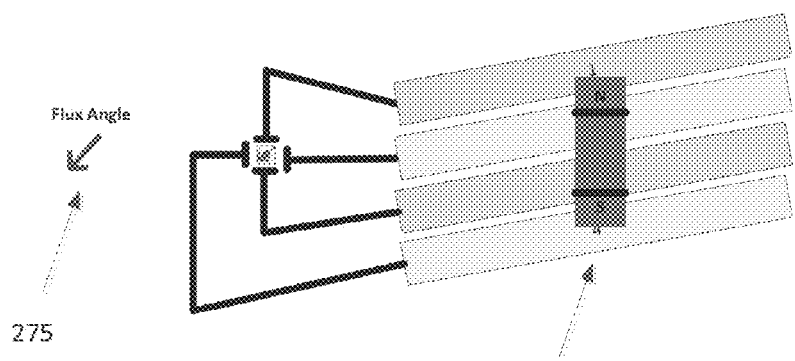
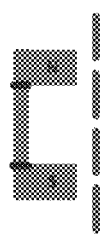
Fig. 8A  Fig. 8B
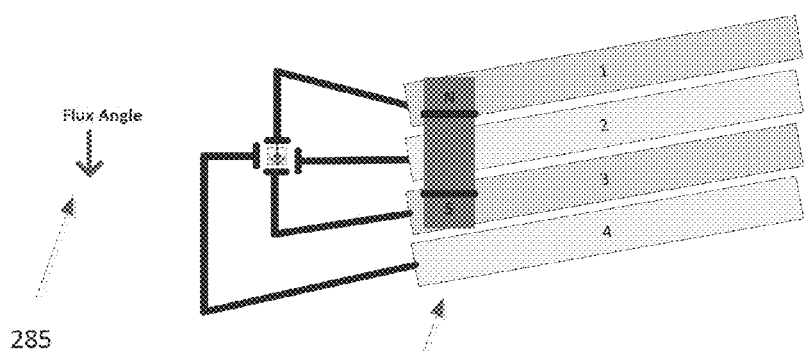
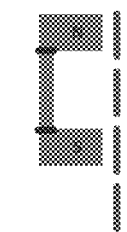
Fig. 9A  Fig. 9B

US 9,772,200 B2

POSITION MEASUREMENT USING ANGLED COLLECTORS

BACKGROUND

The present invention relates to position measurement using a magnetic sensor. More particularly, embodiments of the invention relate to repeatable position measurements by sensing a magnet's position relative to a set of angled flux collectors.

There are many known types of position sensors, including a number of magnetic position sensors. In a typical magnetic sensor, a magnet is connected or otherwise coupled to an element that moves. When the element moves, the magnet moves. Broadly speaking, changes in the magnetic field caused by movement of the magnet can be correlated to position. Magnetic sensing has many advantages over other technologies, including immunity to a "dirty" environment and relative simplicity when using commercially available sensing integrated circuits (ICs) (e.g., Hall-based and magnetoresistive sensors).

SUMMARY

One challenge or deficiency of current magnetic sensors relates to their inability to measure a long range while using a magnet whose largest linear dimension is a small fraction of the measurement range (e.g., have a repeatable measurement over a 50 mm range using a cylindrical magnet that is only 6 mm long).

In one embodiment, the invention provides a magnetically-based position sensor. The sensor includes a magnet, a first collector, a second collector, and a magnetic sensing element. The magnet has at least two poles, and moves along a path. The first collector has a first end and a second end and is configured to collect a magnetic flux. In addition, the first collector is positioned at an angle relative to an axis running parallel to the path and perpendicular to the magnet. The second collector is configured to collect a magnetic flux, and is positioned at an angle relative to the axis running parallel to the path and perpendicular to the magnet, and parallel to the first collector. The magnetic sensing element is coupled to the first and second collectors. A magnetic flux is collected by the first and second collectors, and varies as the magnet moves along the path such that the magnetic flux collected by the first and second collectors indicates a position of the magnet along the path.

In another embodiment, the invention provides magnetically-based position sensor including a magnet, at least one magnetic sensing element, a first collector, a second collector, and a common collector. The at least one magnetic sensing element magnetically is coupled to a first pole of the magnet. The first collector is coupled to one of the at least one magnetic sensing elements, and is fixed in position. The second collector is coupled to one of the at least one magnetic sensing elements, and is fixed in position. The common collector is configured to travel along a path, and has a first end magnetically coupled to a second pole of the magnet, and a second end angled such that when the common collector is positioned at a first end of the path, the second end of the common collector is positioned over the first collector only, and when the common collector is positioned at a second end of the path, opposite the first end of the path, the common collector is positioned over the second collector only.

Other aspects of the invention will become apparent by consideration of the detailed description and accompanying drawings.

BRIEF DESCRIPTION OF THE DRAWINGS

FIG. 7A is a schematic representation of the position measuring system of FIG. 6 showing travel of the magnet.

FIG. 7B is a schematic side view of the position measuring system shown in FIG. 7A.

FIG. 8A is a schematic representation of the position measuring system of FIG. 6 showing travel of the magnet.

FIG. 8B is a schematic side view of the position measuring system shown in FIG. 8A.

FIG. 9A is a schematic representation of the position measuring system of FIG. 6 showing travel of the magnet.

FIG. 9B is a schematic side view of the position measuring system shown in FIG. 9A.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. In addition, no single element or feature should be deemed indispensable or essential merely because it is described as part of a particular embodiment or example explained or set forth herein.

Figure 1:
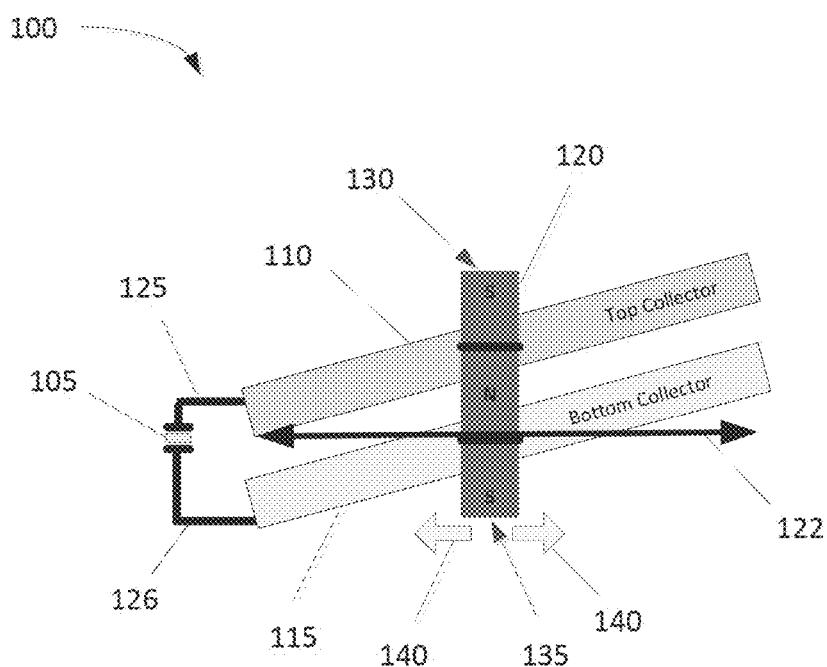
FIG. 1 is a schematic representation of a position measuring system with angled collectors.

FIG. 1 shows an embodiment of the invention in the form of a position measuring system 100. The system 100 includes a magnetic sensing element (e.g., a Hall Effect sensor) 105, a top collector 110, a bottom collector 115, and a magnet 120. Arrow 122 indicates a path of travel of the magnet 120. Arrow 122 also represents an axis relative to the magnet 120. The top and bottom collectors 110 and 115 are positioned parallel to one another and angled relative to the axis 122. While the figures show the collectors 110 and 115 being exactly parallel to one another, it is not necessary for them to be exactly parallel. Thus, the use of the term "parallel" in the specification and claims is meant to describe a general relationship and is not meant to infer that the collectors 110 and 115 are exactly parallel to one another. In addition, while the figures show the path of travel and axis 122 as perpendicular to the magnet 130, it is not necessary for the path of travel or the axis 122 to be perpendicular to the magnet 130 (e.g., the magnet 130 can be tilted). The area between the collectors 110 and 115 (i.e., the gap) depicted in the figures represents a boundary between the collectors 110 and 115 which the poles of the magnet 130 pass over as the magnet 130 moves along the path. It is conceivable that the collectors 110 and 115 are positioned in offset planes and actually overlap when viewed from the magnet 130. In this circumstance, the boundary would be blurred, but a boundary would still exist for the poles of the magnet 130 to pass over.

Figure 5:
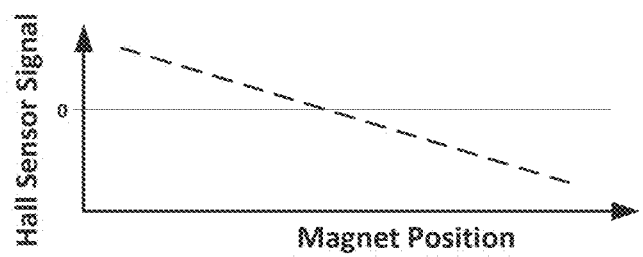
FIG. 5 is a graph of the output of the position measuring system of FIG. 1.
Figure 2:
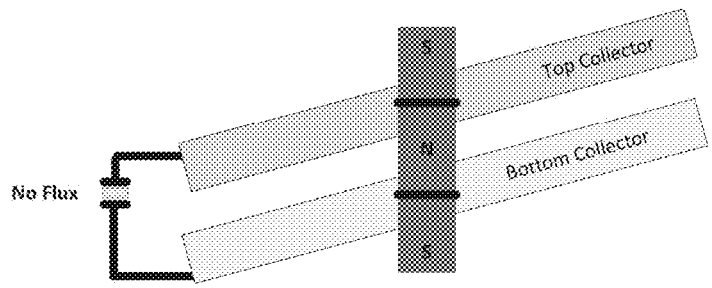
FIG. 2 is a schematic representation of the position measuring system of FIG. 1 showing travel of the magnet.
Figure 3:
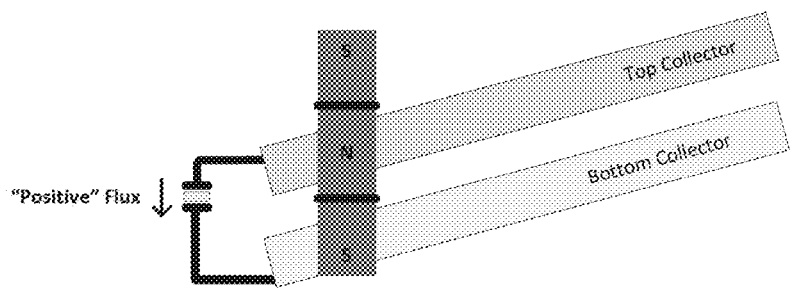
FIG. 3 is a schematic representation of the position measuring system of FIG. 1 showing travel of the magnet.
Figure 4:
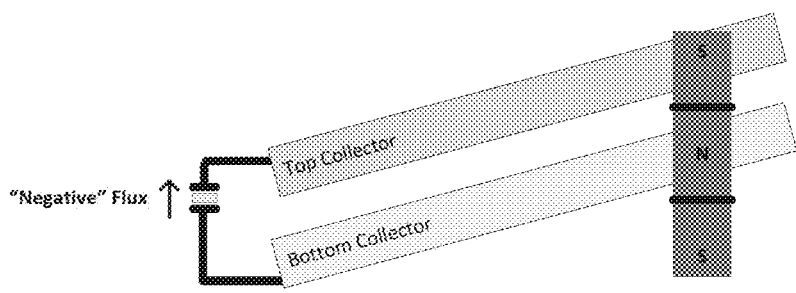
FIG. 4 is a schematic representation of the position measuring system of FIG. 1 showing travel of the magnet.

The collectors 110 and 115 are positioned such that a significant percentage of the magnet's flux flows through magnetic circuit elements 125 and 126, and the magnetic sensing elements 105. The collectors 110 and 115 and the magnetic circuit elements 125 and 126 are made from a material with a relatively high magnetic permeability. In the embodiment shown, the magnet 120 is a permanent magnet having a north pole in its center and south poles in an upper end 130 and a lower end 135. The magnet 120 travels along a path perpendicular to the length of the magnet 120, and parallel to and a fixed distance from the plane of the collectors 110 and 115. Arrows 140 indicate the directions of travel of the magnet 120. As shown in FIG. 2, when the magnet 120 is approximately in the center of its range of travel, there is little or no flux at the magnetic sensing element 105. As the magnet travels in a first direction from the center, the north pole moves over the top collector 110 and the lower south pole 135 moves over the bottom collector 115 (see FIG. 3). As the magnet 120 moves in this direction, flux flows from the top collector 110 to the bottom collector 115 in increasing amounts and the output of the magnetic sensing element 105 goes more positive. Conversely, as the magnet travels in a second direction from the center, the north pole moves over the bottom collector 115 and the upper south pole 135 moves over the top collector 110 (see FIG. 4). As the magnet 120 moves in this direction, flux flows from the bottom collector 115 to the top collector 110 in increasing amounts and the output of the magnetic sensing element 105 goes more negative. FIG. 5 shows a graph of possible outputs of the magnetic sensing element 105 based on the position of the magnet 120.

Figure 6:
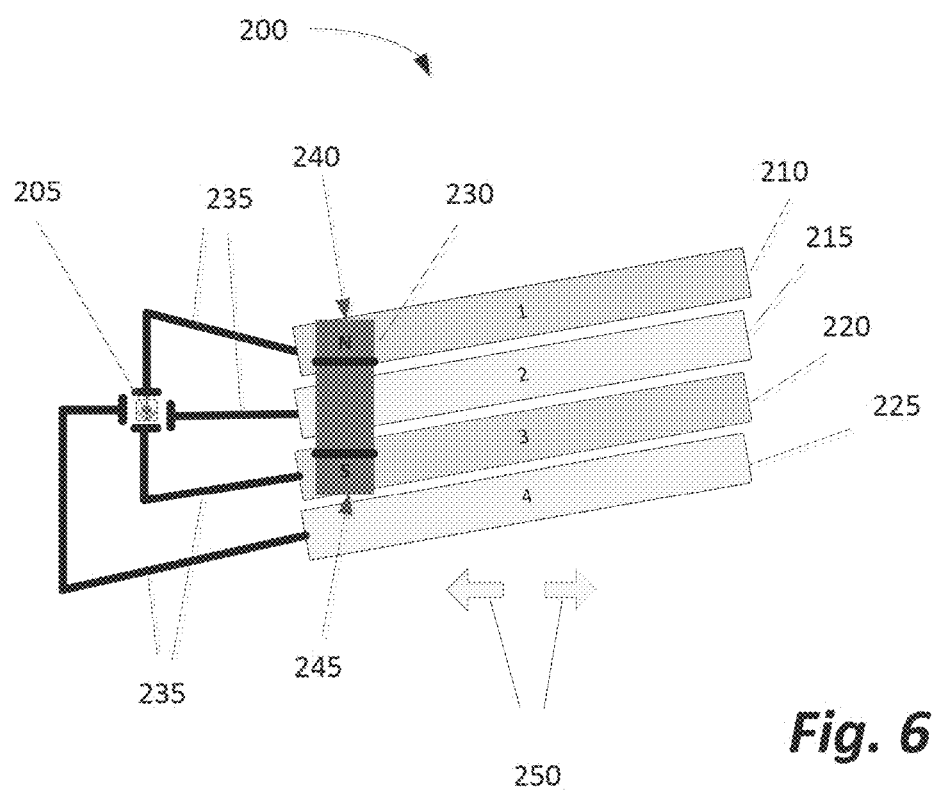
FIG. 6 is a schematic representation of an alternative position measuring system.

FIG. 6 shows another embodiment of the invention in the form of a position measuring system 200. The system 200 includes a magnetic angle sensor 205, a top collector 210, an upper-middle collector 215, a lower-middle collector 220, a bottom collector 225, and a magnet 230. The collectors 210, 215, 220, and 225 are positioned parallel to one another and angled relative to the magnet 230. Again, the collectors 210, 215, 220, and 225 and magnetic circuit elements 235 are made from a material with a relatively high permeability. In the embodiment shown, the magnet 230 is a permanent magnet having a single pole pair—a north pole 240 and a south pole 245. The magnet 230 may be a magnet assembly, including magnets and/or pole pieces.

The magnet 230 travels perpendicular to the length of the magnet 230, parallel to and a fixed distance from the plane of the collectors 210, 215, 220, and 225. Arrows 250 indicate the directions of travel of the magnet 230. As shown in FIG. 7A, when the magnet 230 is at a first end 260 of its range of travel, the magnetic angle sensor 205 detects a first flux angle 265 (e.g., 270°). When the magnet 230 is approximately in the center 270 of its range of travel, the magnetic angle sensor 205 detects a second flux angle 275 (e.g., 225° or about 45° from the first flux angle 265) (see FIG. 8A). When the magnet 230 is at a second end 280 of its range of travel, the magnetic angle sensor 205 detects a third flux angle 285 (e.g., 180° or about 90° from the first flux angle 265) (see FIG. 9A).

Figure 10:
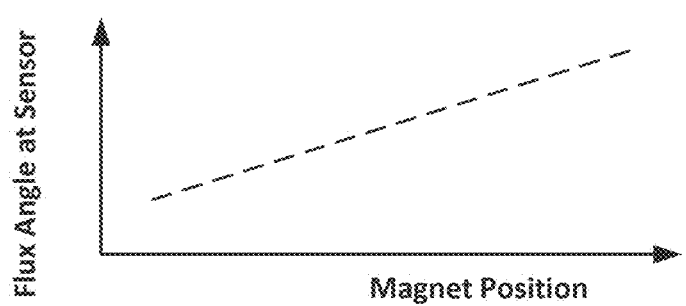
FIG. 10 is a graph of the output of the position measuring system of FIG. 1.

FIGS. 7B, 8B, and 9B show a position of a u-shaped magnet 205 relative to the collectors 210, 215, 220, and 225 at the first end 260, the center 270, and the second end 280, respectively. When the magnet 230 is positioned at the first end 260 (e.g., FIGS. 7A and 7B), the magnetic flux travels from the upper-middle collector 215 to the bottom collector 225. As the magnet 230 moves from the first end 260 to the center 270, the magnetic flux travels over multiple paths (e.g., from the top collector 210 and the upper-middle collector 215 to the lower-middle collector 220 and the bottom collector 225). When the magnet 230 is positioned at the second end 280 (e.g., FIGS. 9A and 9B), the magnetic flux travels from the top collector 210 to the lower-middle collector 220. The flux angle changes relatively linearly over the course of travel of the magnet 230. FIG. 10 shows a graph of a possible output of the magnetic angle sensor 205 based on the position of the magnet 230.

A monotonic shifting of the flux angle at the sensor 205 occurs as the magnet 230 changes position. If the gap between the magnet 230 and the collectors 210, 215, 220, and 225 changes, the measured angle does not change significantly. The magnitude of the flux density at the sensor 205 may change, but the ratio of the flux traveling down each magnetic circuit path stays approximately the same. It is generally believed that the monotonic shifting of the angle in the measuring system 200 provides a more accurate determination of magnet position than the position measuring system 100.

Figure 11A:
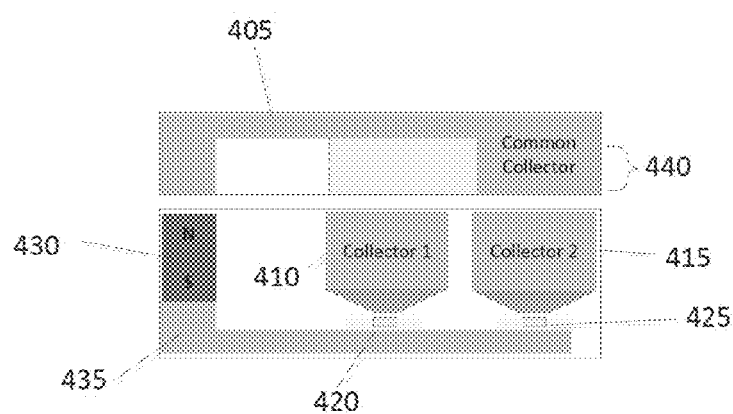
FIG. 11A is a schematic representation of another position measuring system.
Figure 11B:
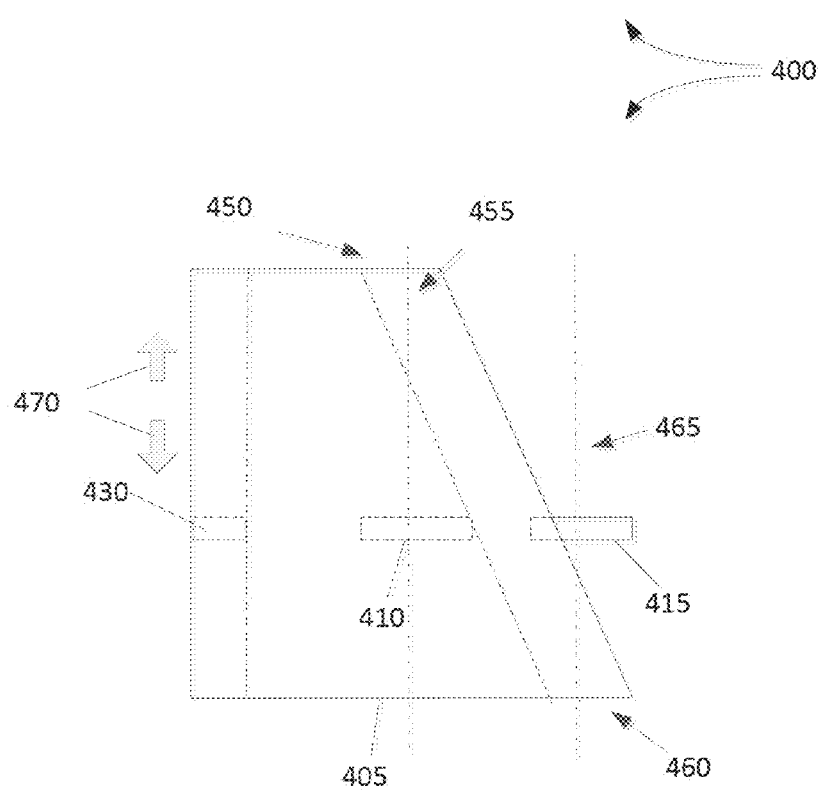
FIG. 11B is a top view of the position measuring system of FIG. 11A.
Figure 12A:
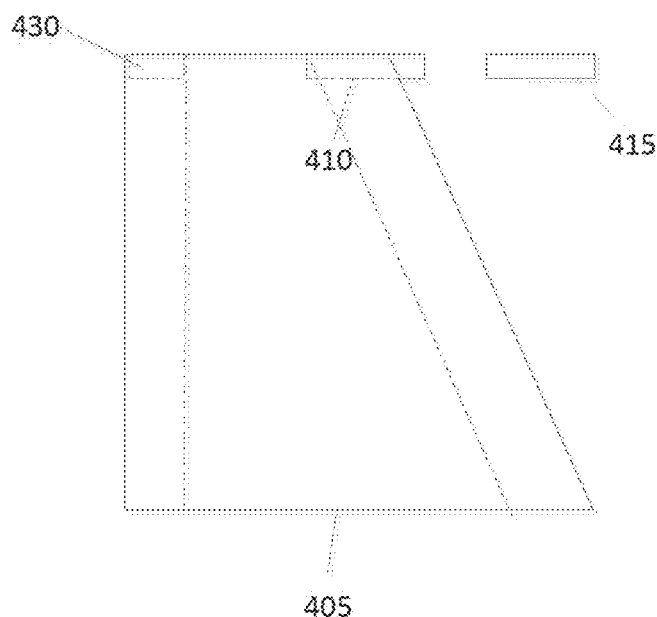
FIGS. 12A and 12B show the movement of a common collector of the position measuring system of FIGS. 11A and 11B.
Figure 12B:
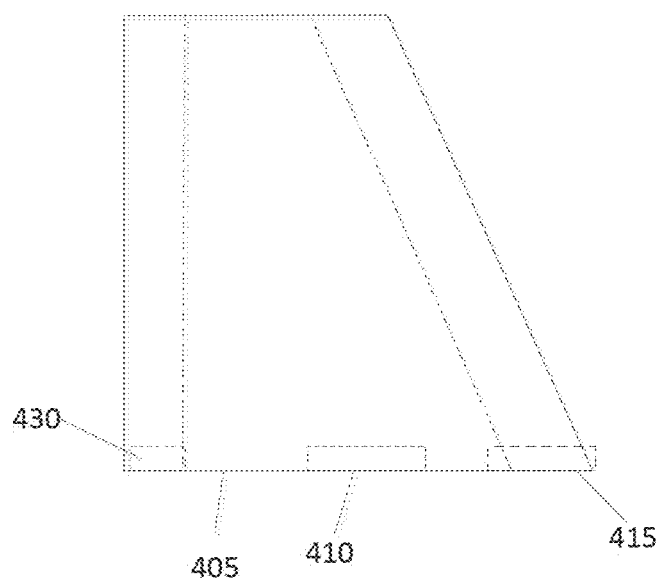
Figure 13:
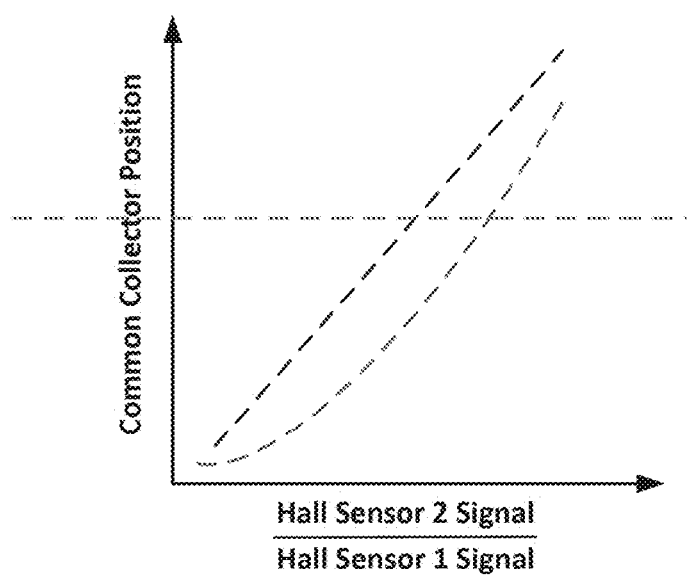
FIG. 13 is a graph of the ratio of the outputs of the position measuring system of FIGS. 11A, 11B, 12A, and 12B.

FIGS. 11A and 11B show yet another alternative embodiment of the invention—a position measuring system 400. The system 400 includes a common collector 405, a first collector 410, a second collector 415, a first magnetic sensor 420 (coupled to the first collector 410), a second magnetic sensor 425 (coupled to the second collector 415), a magnet 430, and magnetic circuit elements 435. The first and second collectors 410 and 415, the magnet 430, the sensors 420 and 425, and the magnetic circuit elements 435 are positioned relative to each other as shown in the figures. In order to increase the magnetic flux detected, the sensors 420 and 425 are located in the vicinity (i.e., near) of the collectors 410 and 415, respectively. The common collector 405 includes a lowered element 440 that is angled (i.e., a magnetic feature) such that at a first end 450 of the lowered element 440 shares an axis 455 with the first collector 410, and a second end 460 of the lowered element 440 shares an axis 465 with the second collector 415. The common collector 405 moves in the directions shown by the arrows 470. When the common collector 405 is at a first end of its range of travel (see FIG. 12A), a magnetic coupling with the first collector 410 occurs. As the common collector 405 travels to a second end of its range of travel (see FIG. 12B), the magnetic coupling switches from the first collector 410 to the second collector 415. FIG. 13 shows a graph of a ratio of the possible outputs of the magnetic sensors 420 and 425 based on the position of the common collector 405.

Figure 14A:
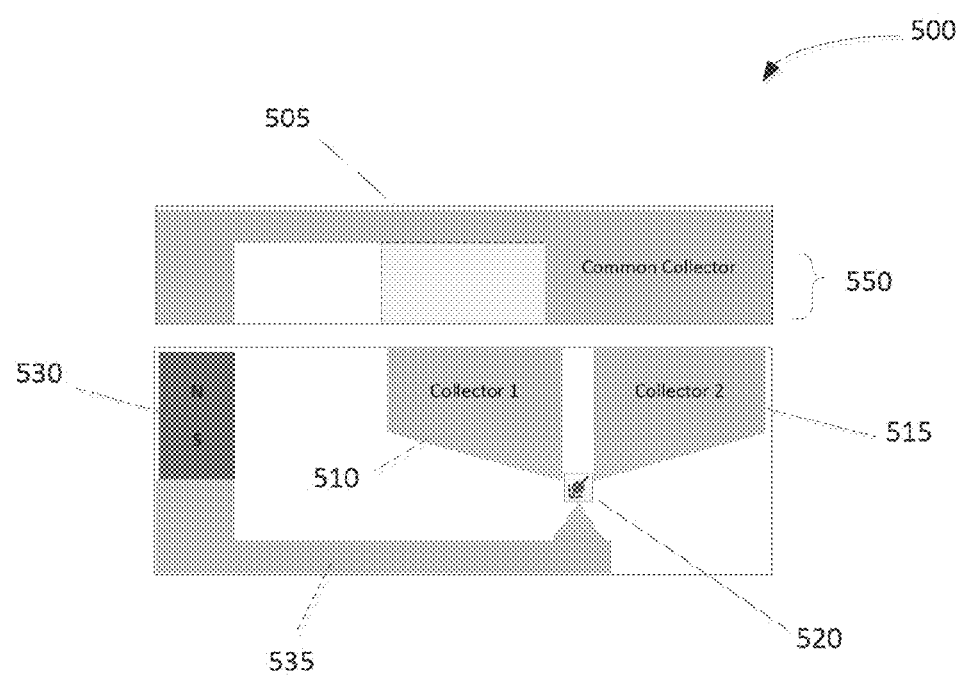
FIG. 14A is a schematic representation of an alternative embodiment of the position measuring system of FIG. 11A.
Figure 14B:
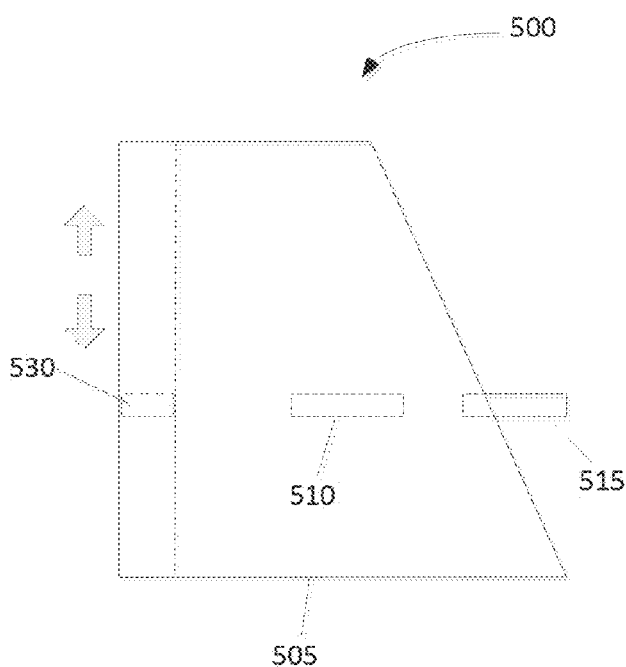
FIG. 14B is a top view of the position measuring system of FIG. 14A.

FIGS. 14A and 14B show another embodiment of the invention—a position measuring system 500. The system 500 includes a common collector 505, a first collector 510, a second collector 515, a magnetic angle sensor 520, a magnet 530, and magnetic circuit elements 535. The first and second collectors 510 and 515, the magnet 530, the sensor 520, and the magnetic circuit elements 535 are positioned relative to each other as shown. The common collector 505 includes a lowered element 550 that is angled the same as common collector 405. As common collector 505 moves through its range of motion, a flux angle detected by the magnetic angle sensor 520 changes as discussed above with respect to previous embodiments.

The common collectors 405/505 can be a stamped piece of material, and have a relatively high magnetic permeability and a relatively low magnetic hysteresis.

In the constructions described above, the magnet can be a permanent magnet (e.g., a ferrite, an alnico, a samarium-cobalt, a neodymium-iron-boron, or other type of magnet). It is also possible for the magnet to be an active magnetic field generator, like an electro-magnet, although in most applications a permanent magnet will be selected because of the lower system cost.

Also in the constructions described above, the magnets have a simple shape. However, it is also possible to use magnets of other shapes to improve performance or meet packaging constraints. As an example, the magnets could take on a "U" shape to better direct the flux lines to the collectors. In addition, the magnets could take on a shape to reduce the influence of movement in the direction orthogonal to the movement the system is trying to measure. For example the magnet poles could be wider or narrower than the collectors so that movement "up" or "down" would have a much smaller influence on the coupling between the magnet poles and the relevant collector. In addition, the magnets in this description may include pole pieces as part of a magnet assembly.

For repeatable sensor performance it is important that the nonmoving components and their associated magnetic circuits stay approximately fixed relative to each other. Therefore, the collectors are held in place with mechanical constraints. For example, the components could be held in place with over-molded plastic supports or with potting.

It is also important that the sensors are held in place relative to the magnetic circuit elements and the magnetic flux concentrators directing the flux to the sensor(s).

In the constructions using magnetic sensing elements, the sensor itself is preferably a Hall Effect sensor or other magnetic sensor that can measure flux density. In the constructions using a magnetic angle sensor, the sensor can be a magnetoresistive sensor (e.g., AMR, GMR, and TMR) or a Hall-based angle sensor. Typically, multiple Hall sensors in a single device are used to collectively measure the angle of the magnetic flux. Other technologies that can measure flux angle can also be used. Commercially available sensors (e.g., from Allegro, Micronas, Infineon, NXP, and others) can be used in the embodiments described above.

The collectors and magnetic circuit elements are depicted above as simple shapes, but they could be complex 3-dimensional shapes. For example, the collector could be relatively flat with a tab coming out of one edge (top edge, bottom edge, or side edges), perpendicular to the collector, and eventually leading to the sensor area. The magnetic circuit elements leading to the sensor(s) could be any shape and connected anywhere on the collectors. Effectively, the magnetic circuit elements are a part of the respective magnetic collectors. In other constructions, the sensor could be placed directly next to the collector such that there is no identifiable magnetic circuit element coming from the collector. Those knowledgeable in the art will recognize that this does not change the concepts within this invention.

The flux collector and magnetic circuit elements are designed to be compatible with the flux densities expected within the application. The design considers the flux level at which the collector or the magnetic circuit element may saturate. Saturation causes the magnetic circuit reluctance to change and will, as a consequence, change the measurement from the expected measurement for the magnet's position.

Also, the orientation of the magnet (distance between the collectors and the magnet) and the relative orientation of the magnet with respect to the collectors can also be modified.

It is also possible to create collectors that follow the path of a magnet when the magnet does not travel in a straight line. For example, if a magnet travels along a curve, the collectors could be designed to fit along the inside or outside of the curve and, as long as the distance between the magnet and the collectors is approximately constant, the output signal (ratio or angle) would vary continuously with the magnet position.

Various features and advantages of the invention are set forth in the following claims.

What is claimed is:

1. A magnetically-based position sensor comprising:
  a magnet having at least two poles, the magnet moving along a path, and the at least two poles facing substantially the same direction;
  a first collector having a first end located at a first end of the path and a second end located at a second end of the path and configured to collect a magnetic flux, wherein a first axis through the first end of the first collector and the second end of the first collector is positioned non-parallel and at a non-perpendicular angle relative to a second axis running parallel to the path, wherein the first collector is aligned with the first axis;
  a second collector configured to collect a magnetic flux, the second collector having a third end located at the first end of the path and a fourth end located at the second end of the path, wherein a third axis through the third end of the second collector and the fourth end of the second collector is positioned non-parallel and at a non-perpendicular angle relative to the second axis running parallel to the path, the second collector being substantially parallel to the first collector resulting in a gap between the second collector and the first collector that is substantially uniform along the path, wherein the second collector is aligned with the third axis; and
  a magnetic sensing element coupled to the first and second collectors;
  wherein the first collector and the second collector face in substantially the same direction and the at least two poles of the magnet face the first and second collectors;
  wherein the magnet varyingly overlaps the first collector, the second collector, or both as it moves along the path, and
  wherein a magnetic flux collected by the first and second collectors varies as the magnet moves along the path such that the magnetic flux collected by the first and second collectors indicates a position of the magnet along the path.

2. The sensor of claim 1, wherein the magnet has a first center pole and an opposite pole on each end of the magnet.

3. The sensor of claim 2, wherein when the magnet is positioned at the first end of the first collector, the first collector is positioned to at least partially overlap the center pole and the second collector is positioned to at least partially overlap one of the opposite poles, and such that when the magnet is positioned at the second end of the first collector, the second collector is positioned to at least partially overlap the center pole and the first collector is positioned to at least partially overlap the other opposite pole.

4. The sensor of claim 1, wherein the magnetic sensing element is a Hall Effect sensor.

5. The sensor of claim 1, wherein the magnetic sensing element is a magnetic angle sensor.

6. The sensor of claim 5, further comprising a third and a fourth collector, the third and fourth collectors positioned parallel to and between the first and second collectors.

7. The sensor of claim 6, wherein the first, second, third, and fourth collectors are all on the same plane.

8. The sensor of claim 6, wherein the first, second, third, and fourth collectors are all coupled to the magnetic sensing element.

9. The sensor of claim 6, wherein the magnet has two poles.

10. The sensor of claim 9, wherein a flux angle of the flux collected by the first, second, third, and fourth collectors at the magnetic angle sensor rotates as the magnet moves along the path.

11. The sensor of claim 1, wherein the magnetic flux sensed by the magnetic sensing element indicates the position of the magnet.

12. A magnetically-based position sensor comprising:
a magnet fixed in position;
at least one magnetic sensing element magnetically coupled to a first pole of the magnet;
a first collector coupled to one of the at least one magnetic sensing elements, and fixed in position;
a second collector coupled to one of the at least one magnetic sensing elements, and fixed in position; and
a common collector magnetically coupled to a second pole of the magnet and configured to travel along a linear path between two ends, the common collector including an angled magnetic feature with a first end and a second end, wherein the angled magnetic feature is angled with respect to a plane that extends perpendicularly from the linear path through the first collector;
wherein the first end of the angled magnetic feature moves along a first axis and couples a first magnetic flux between the magnet and the first collector, and the second end of the angled magnetic feature moves along a second axis and couples a second magnetic flux between the magnet and the second collector;
wherein the first magnetic flux collected by the first collector and the second magnetic flux collected by the second collector vary as the common collector moves along the linear path such that the first magnetic flux is different than the second magnetic flux and the first magnetic flux and the second magnetic flux indicate a position of the common collector along the linear path.

13. The sensor of claim 12, wherein the at least one magnetic sensing element is a Hall Effect sensor, the first collector is coupled to a first Hall Effect sensor and the second collector is coupled to a second Hall Effect sensor.

14. The sensor of claim 12, wherein the at least one magnetic sensing element is a magnetic angle sensor, where in the first and second collectors are both coupled to the magnetic angle sensor.

15. The sensor of claim 14, wherein a flux angle of the first magnetic flux collected by the first collector and the second magnetic flux collected by the second collector rotates as the common collector moves along the path.

16. A magnetically-based position sensor comprising:
a magnet assembly that moves along a linear path and that includes a magnet with at least two poles;
at least two magnetic collectors that have boundaries that are crossed by at least part of the magnet assembly as the magnet assembly moves along the linear path, each of the at least two magnetic collectors substantially facing the same direction;
a magnetic sensor coupled to the at least two magnetic collectors;
wherein the at least two poles of the magnet and the at least two magnetic collectors face each other;
wherein the at least two magnetic collectors include a first collector having a first end located in a first plane with a first end of the linear path and a second end located in a second plane with a second end of the linear path, the first and second planes being perpendicular to a first axis of the linear path;
wherein a second axis through the first end of the first collector and the second end of the first collector is positioned non-parallel and at a non-perpendicular angle relative to the first axis of the linear path;
wherein the first collector is aligned with the second axis;
wherein the magnetic sensor produces a signal that is related to the position of the magnet assembly as the magnet assembly moves along the linear path.

17. The sensor of claim 16, wherein the magnetic sensor measures the flux density at a location between the magnetic collectors.

18. The sensor of claim 16, wherein the magnetic sensor measures the flux angle at a location between the magnetic collectors.

19. The sensor of claim 16, wherein a third plane in which the collectors are located and the linear path of the magnet assembly are parallel.

20. The sensor of claim 16, wherein the magnet assembly includes a North and South pole such that some magnetic flux will travel between the poles through the collectors.

21. A magnetically-based position sensor comprising:
a common collector that moves along a linear path between two ends and has a non-parallel magnetic feature to the linear path that has a non-perpendicular angle to the linear path;
at least two magnetic collectors including a first collector and a second collector that are magnetically coupled to the magnetic feature;
a source of magnetic flux;
at least one magnetic sensor;
wherein one pole of the source of magnetic flux is magnetically coupled to the magnetic feature of the common collector and the other pole of the source of magnetic flux is magnetically coupled to the at least two magnetic collectors via the at least one magnetic sensor throughout a length of the linear path;
wherein the at least one magnetic sensor produces a signal that can be related to the position of the common collector as the common collector moves along the linear path;
wherein a first end of the magnetic feature moves along a first axis and couples a first magnetic flux between the source of magnetic flux and the first collector, and a second end of the magnetic feature moves along a second axis and couples a second magnetic flux between the source of magnetic flux and the second collector, the first magnetic flux differing from the second magnetic flux as the common collector moves along the linear path;
wherein the magnetic feature is angled with respect to a plane that extends perpendicularly from the linear path through the first collector.

22. The sensor of claim 21, wherein the at least one magnetic sensor measures the flux density at a location near the magnetic collectors.

23. The sensor of claim 22, wherein the source of magnetic flux is a permanent magnet.

24. The sensor of claim 22, wherein the at least one magnetic sensor measures the flux angle at a location near the magnetic collectors.

25. The sensor of claim 22, wherein the magnetic feature on the common collector is a surface that is closer to the at least two magnetic collectors than other parts of the common collector.

* * * * *